INVENTOR.
ALOYSIUS W. PRATT
BY
ATTORNEY

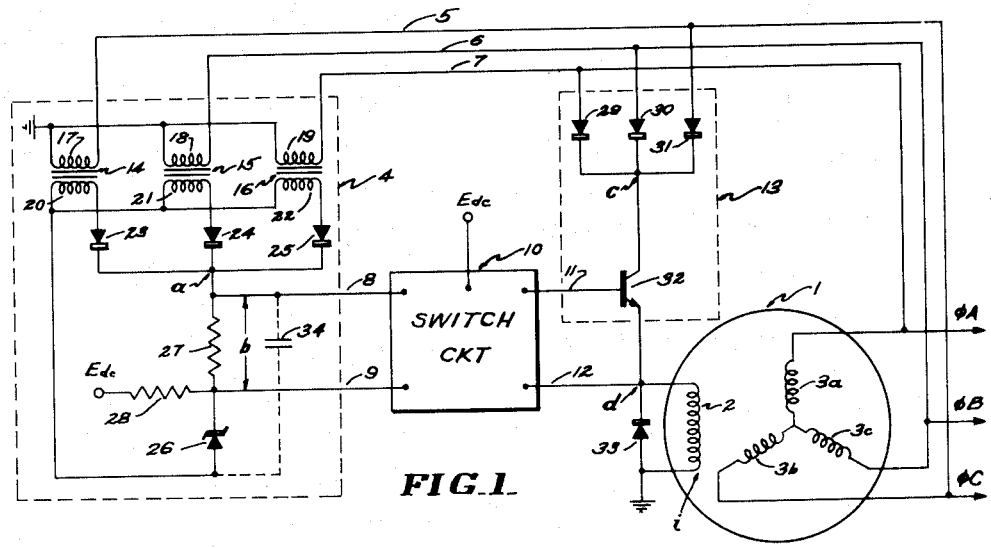

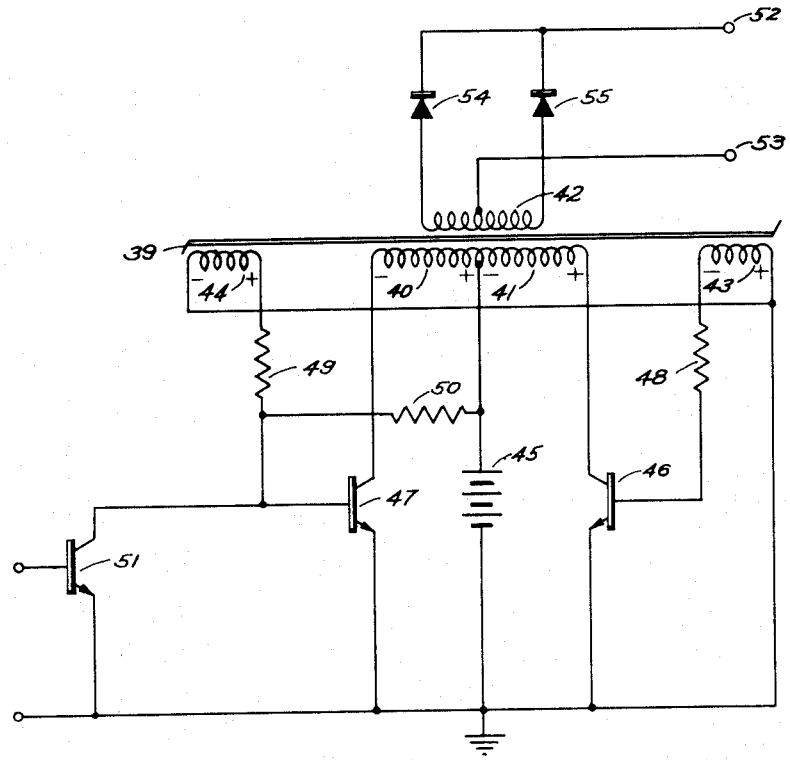
FIG_5_
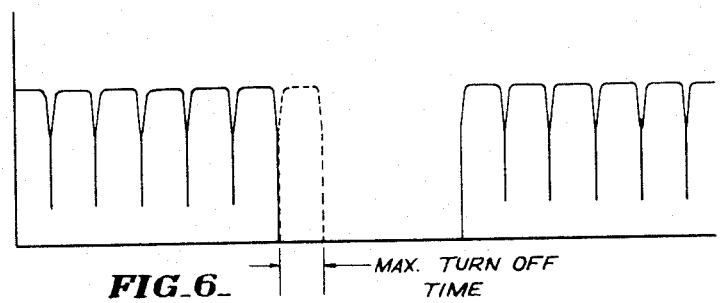
FIG_6_ — MAX. TURN OFF TIME

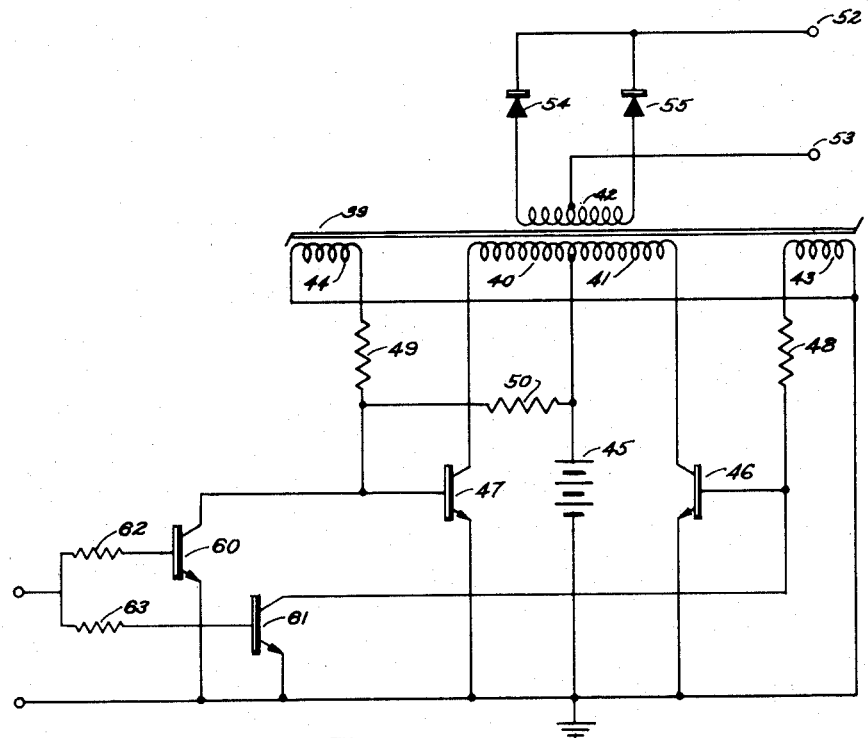
FIG_7_
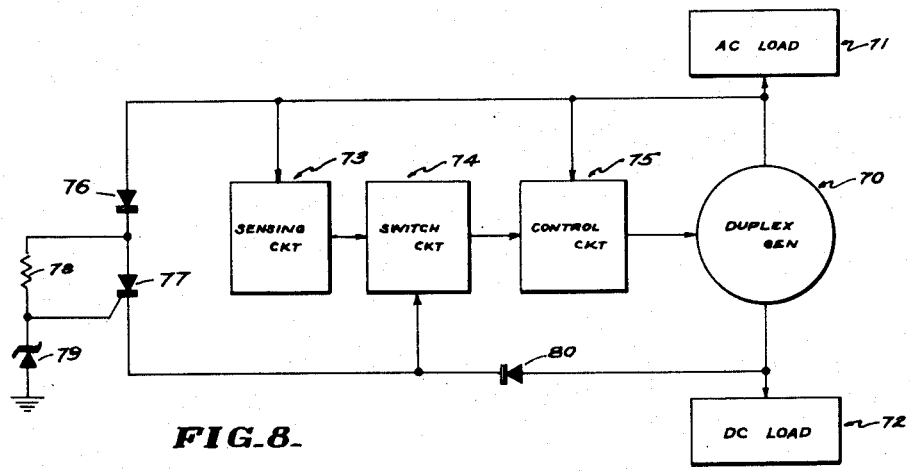
FIG_8_
INVENTOR.
ALOYSIUS W. PRATT
BY
ATTORNEY

United States Patent Office  3,170,110
Patented Feb. 16, 1965

3,170,110
ALTERNATING CURRENT GENERATOR REGULATING SYSTEM WITH PULSE CONTROL SIGNAL
Aloysius W. Pratt, New Carlisle, Ohio, assignor to American Machine & Foundry Co., a corporation of New Jersey
Filed July 12, 1961, Ser. No. 123,467
15 Claims. (Cl. 322—28)

This invention relates to electrical generating equipment and more particularly to an improved regulating system for use with alternating current generators to maintain a constant output potential regardless of load conditions.

With most electrical generating equipment, increases in the load tend to increase the internal potential drop of the generator, causing a decrease in generator output potential. In most installations, this potential decrease is undesirable, particularly when the load includes voltage sensitive equipment. Some type of compensation is therefore generally required. Since most electrical generators contain a field winding which controls the generator output potential directly in accordance with the potential applied to the field winding, appropriate changes in the field winding potential often provide such compensation. Usually, the generator output is sensed, either directly or indirectly, and then compared with a potential standard to derive a difference potential which is subsequently inverted and amplified to provide a potential inversely related to the generator output potential. This inverse potential is applied to the field winding so that, as generator output potential tends to increase, the field winding potential decreases, thus compensating for the increase. Similarly, a tendency of the output potential to decrease is compensated by increased field potential.

One difficulty with prior art control systems of this type is that they usually employ mechanically moving parts or vacuum tubes and therefore are of limited reliability. An even more serious difficulty with control systems proposed heretofore is that they usually depend on an analog feedback signal for their operation, i.e., they depend on a slowly varying direct current signal resulting from comparison with the potential standard to provide compensated field winding potential. One drawback of such an analog system is that most of the circuit components through which this signal passes have a tendency to change their characteristics with changes in ambient temperature, resulting in a net change in regulated generator output potential with changes in temperature. Another drawback is that the past analog systems tend to overcompensate under rapidly changing load conditions, so that oscillatory transients occur until stable conditions are resumed. Still another drawback with an analog system is that, generally, some sort of linear amplifier is required and, since the analog signal is essentially a slowly varying direct current signal, the problems inherent with direct current amplification are present.

A general object of the present invention is to provide an alternating current generator regulating system wherein the problems encountered in prior devices of this general type are avoided.

Another object is to devise such a system wherein semiconductors can be employed throughout, and a greater measure of reliability can thus be achieved. In this connection, the invention can employ semi-conductor devices operated in a switching mode, so that problems of ambient temperature effects and direct current amplification are eliminated.

A further object is to provide an alternating current generator regulating system capable of operation with a pulse control signal, instead of an analog signal, so as to have a relatively short time response which eliminates oscillatory transients under rapidly changing load conditions.

Still another object is to devise a system of the type described which provides regulation within extremely close tolerances.

In essence, the present system includes a sensing circuit which senses the generator output and develops a pulse control signal in which the pulse width is inversely related to the output potential, and a control circuit which energizes the field winding for the duration of each of the pulses. Thus, as the output potential tends to increase the pulses become narrower and less energy is provided to the field winding thereby compensating and reducing the output potential. If the output tends to decrease, the pulse width increases to compensate in the other direction.

The pulse conrol signal is developed by a unique sensing circuit in accordance with this invention. A half wave rectified signal is mixed with a constant potential signal to derive a signal of changing polarity. This derived signal is employed to operate a switch, the switch being turned on whenever the derived signal becomes negative. In this manner a pulse control signal is developed having a pulse width inversely related to the generator output potential.

In order that the manner in which the foregoing and other objects are attained in accordance with the invention can be understood in detail, reference is made to the accompanying drawings, which form a part of this specification, and wherein:

FIG. 1 is a schematic daigram of a generator regulator system in accordance with one embodiment of the invention;

FIGS. 2a–4e represent wave shapes of various potentials appearing during the operation of the system shown in FIG. 1;

FIG. 5 is a schematic diagram of a switching circuit useful in accordance with the invention;

FIG. 6 is a diagram showing the wave shape of the switching circuit output potential;

FIG. 7 is a schematic diagram of another form of switching circuit useful in accordance with the invention;

FIG. 8 is a diagram of a circuit employed to provide self-starting of the regulator circuits.

Figure 9:
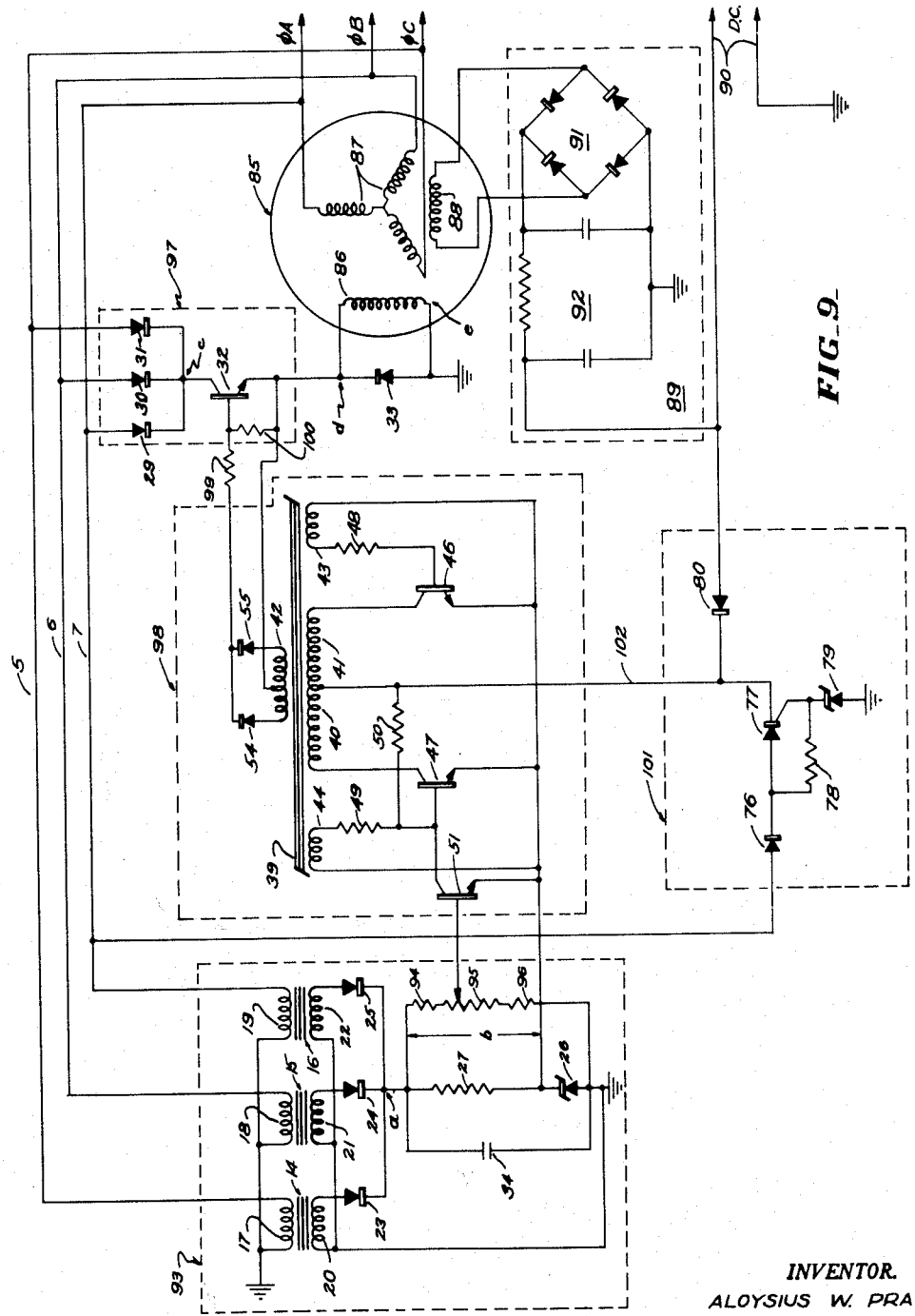
FIG. 9 is a schematic diagram further illustrating the regulator control system of FIG. 1.

The three-phase alternating current generator 1, as shown in FIG. 1, can be of any conventional type and includes a field winding 2 and phase windings 3a, 3b and 3c which produce the three-phase output potentials φA, φB, φC. The field winding, on the one hand, and phase windings, on the other, rotate with respect to one another, and either may be stationary. The windings are arranged so that the potential applied to field winding 2 is operative to control the magnitude of the potentials generated by the phase windings.

A sensing circuit 4 is connected to the generator output via conductors 5, 6 and 7 and provides a signal of changing polarity on conductors 8 and 9. Switching circuit 10 converts the changing polarity signal into a pulse control signal which appears on conductors 11 and 12. A control circuit 13 is connected to the generator output via conductors 5, 6 and 7 and provides energization for field winding 2 in accordance with the width of pulses appearing on conductors 11 and 12.

Sensing circuit 4 includes transformers 14, 15 and 16 having respective primary windings 17, 18 and 19 connected in Y to the three-phase generator output via conductors 5, 6 and 7. Secondary windings 20, 21 and 22 are Y-connected to the anodes of semi-conductor diodes 23, 24 and 25, respectively. Transformers 14, 15 and 16 provide suitable potentials for the sensing circuit and also provide the 180° phase inversion which is characteristic of transformers. The diodes are connected to rectify the transformer output and provide a three-phase half-wave rectified potential at point $a$.

A Zener diode 26 is connected in series with resistance 27 between the common cathode connection of diodes 23, 24 and 25 and the common transformer secondary junction. When a potential exceeding the Zener breakdown potential is applied across the Zener diode and its series resistance, a constant potential is maintained across the diode. Since the potential at point $a$ varies and at times falls below the Zener breakdown potential, an additional direct current source is connected to Zener diode 26 via resistance 28 to insure that a direct current potential exceeding the Zener diode breakdown potential is always present.

The constant potential of Zener diode 26 is superposed on the half-wave rectified potential appearing at point $a$ as is shown in FIG. 2a. The resulting changing polarity signal developed across resistance 27 and appearing on conductors 8 and 9 is as shown in FIG. 2b. This signal can be described as a bipolar signal since it is a signal which changes polarity.

Switching circuit 10 can be any suitable high gain switching circuit having a comparatively short time response. The switching circuit is adjusted to turn on and provide a potential between conductors 11 and 12 whenever bipolar signal potential $b$ is zero or negative (the negative potential $b$ occurring when conductor 8 is negative with respect to conductor 9).

The control circuit 13 includes semi-conductor diodes 29, 30 and 31 having anodes connected to conductors 5, 6 and 7, respectively. The common anode junction of these diodes is connected to field winding 2 via the collector-to-emitter circuit of NPN transistor 32. Thus, whenever a positive potential is applied to the base of transistor 32 via conductor 11, the transistor becomes conductive and current flows from the diodes 29–31 through the transistor and field winding 2 to ground. Free wheeling diode 33 is connected across field winding 2 and poled in a direction to provide a path for current flow developed when the magnetic field of field winding 2 collapses.

The half-wave rectified potentials at points $a$ and $c$ are similar but are phase displaced with respect to one another. Diodes 29, 30 and 31 are poled to pass current from their respective conductors 5, 6 and 7 when these conductors provide a positive potential. Diodes 23, 24 and 25, because of the transformer phase inversion, are poled to pass current when their respective conductors 5, 6 and 7 present a negative potential. By so arranging sensing circuit 4 and control circuit 13 to work on different half cycles of the generator output potentials, the distortions reflected into lines by the switching action of transistor 32 does not affect the operation of the sensing circuit. The waveform of half-wave rectified potential at point $c$ is shown in FIG. 2c.

The switching circuit turns on only when bipolar potential $b$, as shown in FIG. 2b, is negative and therefore transistor 32 is rendered conductive for a discrete time period during which energy passes from diodes 29, 30 and 31 to energize field winding 32. Accordingly, during the time periods when the bipolar signal shown in FIG. 2b is negative, portions of the rectified potential at point $c$ as shown in FIG. 2c are permitted to pass to the field winding in the form of the pulses shown in FIG. 2d. The pulses shown in FIG. 2d appear at point $d$ in FIG. 1. Since the field is highly inductive, and since free wheeling diode 33 permits current flow through the field winding after the pulse has ended, the current $i$ appearing in the field winding is considerably smoother than the potential at point $d$. The current $i$ appearing in the field winding of 2 is shown in FIG. 2e.

The manner in which regulation of the generator output is achieved can be discerned by comparing the wave shapes shown in FIGS. 2a through 2e with those shown in FIGS. 3a through 3e. As the generator output decreases, the half-wave rectified potential at point $a$ in the sensing circuit decreases accordingly. The Zener potential, however, remains constant, resulting in a signal at the input of the switching circuit, as shown in FIG. 3b. The average value of the bipolar signal $b$, as shown in FIGS. 2b and 3b is directly related to the generator output potential, which is to say that the average value becomes more negative as the generator output potential decreases, and becomes more positive as the generator output potential increases. The changing polarity signal having a low average value corresponding to a low generator output potential, as shown in FIG. 3b, is negative for a much longer period of time than that shown in FIG. 2b and therefore the resulting pulses shown in FIG. 3d are of a longer time duration. The net result is that the current appearing in the field winding which corresponds to the average value of the pulse signal is larger in magnitude, as shown in FIG. 3e. In this manner, the field current is increased to compensate for the decrease in output potential.

If the generator output potential increases, a similar compensating effect will take place. In this instance, the effect is in the opposite direction, narrowing the pulses and thus reducing the potential across the field winding.

The system can be made to regulate within much closer tolerances by the addition of a filtering device, such as capacitor 34 connected across the diodes 23–25, i.e., between the common diode anode junction and the common transformer secondary junction. The regulation of the system depends upon the quantity of ripple present in the signal appearing at point $a$. In other words, referring to FIG. 2a, a change in generator output potential of magnitude $r$ is sufficient to change from the full off condition, where the potential at point $a$ always exceeds the Zener potential, to the full on condition, where the potential at point $a$ is always below the Zener potential. If the ripple is reduced to a quantity $s$, as shown in FIG. 4a, a much smaller change in potential is required to go from the full on to the full off condition. Accordingly, the addition of a filter, such as capacitor 34, to the system in the manner shown provides regulation to maintain the generator output potential within extremely close tolerances.

One suitable high gain, fast acting switching circuit is shown in FIG. 5. Basically, this circuit is a free-running magnetically coupled multivibrator. This basic circuit is converted into a switching circuit by providing a control transistor operative to selectively disable one of the oscillator transistors and providing apparatus for converting the oscillator's alternating rectangular-shaped pulse output into a direct current signal.

The switching circuit includes a core 39 of high remnance magnetic material having a substantially rectangular hysteresis loop, the core having wound thereon a center-tapped primary winding 40–41, a center-tapped secondary winding 42, and feedback windings 43 and 44. The center tap of primary winding 40–41 is connected to a grounded direct current source of potential 45. The outer end terminals of primary windings 40 and 41 are connected to ground via the collector-to-emitter circuits of NPN transistors 46 and 47, respectively, so that current can flow from potential source 45 through one-half of the primary winding and its associated transistor whenever the transistor is rendered conductive. The base of transistor 46 is connected to one end of feedback winding 43 via resistor 48, and the base of transistor 47 is connected to one end of feedback winding 44 via resistance 49. Resistance 50 is connected between the potential source 45 and the base of transistor 47. The collector-toemitter circuit of an NPN transistor 51 is connected between the base of transistor 47 and ground.

Secondary winding 42 is connected to provide full wave rectified potential at terminals 52 and 53. Terminal 53 is connected to the center tap of secondary winding 42 and terminal 52 is connected to the end terminals of the secondary winding via diodes 54 and 55 poled for operation during alternate half cycles of the potential appearing at the secondary winding.

Assume first that no potential is applied to the base of transistor 51 and, therefore, this transistor is not conductive and no current flows through the collector. Under these circumstances, current begins to flow from the potential source through resistance 50 and the base-to-emitter circuit of transistor 47, rendering this transistor slightly conductive. As a result, current begins to flow from the potential source through primary winding 40 and through the collector-to-emitter circuit of transistor 47, developing a potential of the polarity shown across the primary winding. Assuming that magnetic core 39 is not saturated, the potential applied to winding 40 provides a change of flux in the core, inducing a potential of the polarity shown in feedback winding 44. This induced potential causes additional current flow through the base-to-emitter of transistor 47 via resistance 49, causing transistor 47 to become more conductive. The increased conduction permits more current to flow through the collector-to-emitter circuit, developing a large potential across primary winding 40. The increased potential across primary winding 40 increases the potential on the feedback winding 44 which in turn increases the base potential, eventually driving transistor 47 into saturation and permitting a maximum current flow through the transistor, so as to develop virtually the entire potential from source 45 across primary winding 40. Thus, transistor 47 is rendered conductive by the regenerative coupling between primary winding 40 and feedback winding 44. The change of magnetic flux in core 39 also induces a potential, in secondary winding 42, having a polarity as shown. This secondary potential renders diode 55 conductive, producing an output potential which is positive at terminal 52 with respect to terminal 53. These conditions continue to exist until core 39 reaches saturation.

When core 39 becomes saturated, the potential across the feedback and secondary windings essentially disappears and the current flowing through the base of transistor 47 is abruptly decreased, rendering transistor 47 nonconductive and effectively removing the applied potential from primary winding 40. However, since the primary winding is highly inductive, an inductive "kick" results which develops a small potential across primary winding 40 of a polarity opposite to that shown in the drawing. As a result of the inductive "kick," a small potential is developed in feedback winding 43, providing a small current flow through the base of transistor 46 and rendering this transistor slightly conductive. As a result, current begins to flow through primary winding 41 developing a similar regenerative effect, eventually driving transistor 46 into fully conductive saturation. Under these conditions, a potential is developed across secondary winding 42 which has a polarity opposite to that shown, thus rendering diode 54 conductive to develop an output potential positive at terminal 52 with respect to terminal 53. When core 39 reaches saturation, transistor 46 is rendered nonconductive and the inductive kick similarly initiates the regenerative effect with respect to transistor 47. The operation of this circuit continues in this manner with the transistors 46 and 47 alternately becoming conductive to develop substantially rectangularly shaped alternating pulses on winding 42 which are rectified to provide a substantially direct current potential at terminals 52 and 53.

The operation of the oscillator can be interrupted, and consequently the potential appearing at terminals 52 and 53 can be eliminated, by providing a positive potential on the base of transistor 51 to render this transistor conductive. Under these circumstances, transistor 47 is effectively disabled because the collector-to-emitter circuit of transistor 51 provides a low impedance path bypassing the base-to-emitter circuit of transistor 47. Thus, at the time in the cycle of operation during which transistor 47 should be rendered conductive, operation will cease and the potential at terminals 52 and 53 is eliminated. It should be noted that transistor 51 may be a relatively small transistor operated by a minute potential applied to its base since this transistor is effective to stop oscillation of the circuit merely by shunting the inductive "kick" signal developed in feedback winding 44 so that the regenerative action is never initiated in transistor 47. Thus, extremely large power gains are available, gains as high as 20,000 easily being obtainable.

The turn on time of this switching circuit is extremely short because of the regenerative action which almost instantaneously builds up a potential which appears across the direct current output terminals.

The output waveform is shown in FIG. 6. The turn off time is somewhat longer but in most installations can be made sufficiently short since the maximum turn off time which could occur is one-half cycle or 1/2f seconds where f is equal to the normal relaxation frequency of the oscillator. This is illustrated in the left hand portion of FIG. 6, where the direct current potential appearing at terminals 52 and 53 is shown. The maximum turn off time arises if transistor 46 is just beginning to conduct where the turn off potential is applied to transistor 51. Under these circumstances, the oscillator will continue to operate for an additional half-cycle before the turn off potential becomes effective on transistor 47. Thus, the maximum turn off time delay is shown by the half-cycle pulse in dotted lines. Obviously, by increasing the frequency of operation, the turn off time is decreased. For example, if the normal relaxation frequency of the oscillator is 8,000 cycles per second, the maximum turn off time delay will be 60 microseconds.

The turn off time for the switching circuit can be reduced even further by employing a circuit in accordance with another embodiment, as shown schematically in FIG. 7. This circuit employs an oscillator circuit and an output circuit identical to that previously described with reference to FIG. 5 and therefore like reference numerals are employed for components 39–55. The decrease in turn off is accomplished by employing two switching transistors, one connected to each of the oscillator transistors so that both of the oscillator transistors are simultaneously disabled, thus eliminating the possible half-cycle turn off delay.

The collector-to-emitter circuit of NPN transistor 60 is connected across the base-to-emitter circuit of transistor 47. The collector-to-emitter circuit of transistor 61 is connected across the base-to-emitter circuit of transistor 46. The base of transistor 60 is connected to the common input terminal via resistance 62, and the base of transistor 61 is connected to the common input terminal via resistance 63.

When it is desired to turn off the switch, a positive potential is applied to the input terminal which renders both transistors 60 and 61 conductive to provide a low impedance between the base and ground of transistors 46 and 47. Thus, current which would normally flow through the base-to-emitter circuits of transistors 46 and 47 would be bypassed to ground and therefore the oscillator transistors become nonconducting and oscillations cease. With this double input switching arrangement, the turn off time is reduced to a fraction of a half-cycle of the oscillator relaxation frequency.

In most installations, it is desirable to operate the regulation circuits from the output potentials of the alternating current generator being controlled. Often, the three-phase alternating current generator being controlled also produces a direct current potential and may be referred to as a duplex generator. The direct current potential is provided either by means of a built-in direct current generator forming an integral part of the alternating current generator, or by providing an alternating current output which is subsequently rectified and filtered. Since a direct current output is available, or can readily be made available by rectifying and filtering a portion of the three-phase alternating current output, this direct current potential provides a convenient source for operating the switching circuit and the Zener diode in the sensing circuit. A difficulty experienced with such an arrangement, however, occurs during the starting period when the initial output potentials are developed by the residual magnetism in the field poles. During this starting period, the potential produced is only a fraction of the normal output potential, and is found to be insufficient to place the switching circuit in operation, and, as a result, the switching circuit never places the control circuit in operation and therefore the field winding is never energized to build up the normal output potential. Accordingly, a self-starting circuit is desirable and may be of the type shown in FIG. 8.

A duplex generator 70 is shown in block form which provides an alternating current output of the A.C. load 71 and a direct current output for the D.C. load 72. The regulator circuit for the generator includes a sensing circuit 73, a switching circuit 74 and a control circuit 75, all constructed as hereinbefore described. As previously described in FIG. 1, the sensing circuit 73 and the control circuit 75 are operated from the three-phase alternating current generator output. The switching circuit is normally operated from a direct current potential provided by the generator direct current output.

A sufficient potential to place the switching circuit in operation can be provided from the alternating current output during the initial starting period. During the starting period, both the alternating current and direct current outputs from the generator are substantially below the respective normal general output potentials. However, the generator is normally designed to provide a much higher alternating current output potential and therefore this source of potential would provide sufficient voltage to place the switching circuit in operation.

The potential for the switching circuit is provided via the serially connected diode 76 and controlled rectifier 77 connected between one phase of the alternating current output and the direct current input to the switching circuit, the diodes being poled to provide a proper polarity direct current potential at the switching circuit. Controlled rectifier 77 could be employed to rectify the alternating current potential, thus eliminating the need for diode 76. However, it is generally more economical to provide a separate diode to perform the rectifying function and to employ the controlled rectifier 77 merely as a semi-conductor switch. Controlled rectifier 77 must be arranged to permit current flow only when the direct current output potential is insufficient, this current flow being permitted if a potential is applied to the gate element which is positive with respect to the anode. A suitable sensing circuit includes resistance 78 connected in series with Zener diode 79, the combination being connected between the junction of diode 76 and controlled rectifier 77 and ground. When alternating current appears which could be passed by diode 76 and controlled rectifier 77, this potential produces a fixed Zener diode breakdown potential across the Zener diode. Since the Zener diode is connected to the gate element of controlled rectifier 77, the controlled diode can be fired only if the direct current potential appearing from the direct current generator output on the cathode of the controlled rectifier is less than the potential appearing at the gate element. Thus, controlled rectifier 77 passes current to the switching circuit input only when the generator direct current output is below a predetermined value. Diode 80 is a blocking diode employed to prevent the self-starting circuit from supplying direct current into the generator 70 or direct current load 72.

A complete schematic diagram in accordance with one embodiment of this invention is shown in FIG. 9. The circuit includes a duplex generator 85 comprising a field winding 86, three-phase windings 87, and a single phase output winding 88. The generator is operative to provide a three-phase output from the three-phase windings 87 and a direct current output from single phase winding 88 and rectifier circuit 89, the direct current output appearing on leads 90. The rectifying circuit 89 includes a full-wave rectifier bridge 91 connected across the single phase winding 88 which provides a pulsating direct current potential to the resistance-capacitance filter circuit 92 which in turn filters the pulsating potential to provide smooth direct current on leads 90.

The sensing circuit 93 is essentially the same as that described in FIG. 1 and is connected to the generator output via conductors 5, 6 and 7. Corresponding reference numerals are employed. Instead of taking the half-wave rectified signal at point a directly from this point, it is taken from a voltage divider connected between point a and ground, this voltage divider consisting of resistances 94, 95 and 96 serially connected. The direct current potential for the operation of Zener diode 26 is provided from the switching circuit instead of from the separate direct current source of FIG. 1, since current flows from the rectifying circuit 89 through diode 80, through either transistor 47 or 46, and through the Zener diode to ground. In this manner, sufficient potential to maintain the Zener diode in operation is provided at all times.

Control circuit 97 is connected to the generator output via lines 5, 6 and 7 and is essentially the same as the control circuit shown in FIG. 1 and therefore similar reference numerals are employed. Switching circuit 98 is essentially the same as the switching circuit shown in FIG. 5 and therefore similar reference numerals are employed. The control circuit is coupled to the switching circuit by resistance 99 connected between the base of transistor 32 and the positive switching circuit terminal, and resistance 100 connected across the switching circuit terminals.

The self-starting circuit 101 is essentially the same as the circuit shown in FIG. 8 and similar reference numerals are employed. This circuit provides the required direct current potential for switching circuit 98 via conductor 102. During the initial starting period, potential is provided from conductor 7 via diode 76 and controlled rectifier 77. As soon as the direct current potential at terminals 90 builds up to a sufficient value, potential is provided via diode 80. Controlled rectifier 77 can no longer conduct since the anode potential is positive with respect to the gate potential provided by Zener diode 79.

Attention is called to copending application Serial Number 123,468, filed July 12, 1961, in the name of the same inventor in which the switching circuits described in FIGS. 5–7 are specifically claimed.

While particularly advantageous embodiments of the invention have been shown, the invention is by no means limited thereto, and it is obvious that numerous changes and modifications could be made without departing from the scope of the invention as set forth. The invention is pointed out more particularly in the appended claims.

What is claimed is:

1. In a system for maintaining a desired voltage output level from an alternating current generator having a control winding operative to control the generator output potential, the combination of a sensing circuit operatively connected to sense the generator output potential and to combine with a half-wave rectified potential obtained therefrom with a constant direct current potential to produce a bipolar pulse signal having an average value related to the generator output potential, the produced pulse signal having a wave form in which the varying unidirectional potential in alternate half-cycles is a portion of a sinusoid and the varying portion has half-wave symmetry, a control circuit connected to the control winding and operative to selectively energize said control winding, and a switching circuit operative to energize the control winding via said control circuit when said bipolar signal is of a certain polarity.

2. In a system for maintaining a desired voltage output level from an alternating current generator having a control winding operative to control the generator output potential, the combination of a sensing circuit comprising rectifying means for developing from the generator output potential a varying potential unipolar signal, means for developing a constant potential, and mixing means for mixing said varying potential signal with said constant potential signal to derive a bipolar pulse signal having a wave form in which the varying unidirectional potential of alternate half-cycles is a portion of a sinusoid with the varying portion having half-wave symmetry and a continuously varying rate of change during each cycle; a control circuit connected to the control winding and operative to selectively energize said control winding; and a switching circuit operative to permit energization of the control winding via said control circuit when said bipolar signal is of a certain polarity.

3. A system in accordance with claim 2, and further including a filter capacitor connected across said rectifying means to maintain regulation within closer tolerances.

4. In a system for maintaining a desired voltage output level from a three-phase alternating current generator having a field winding operative to control the generator output potential, the combination of a sensing circuit operative to derive a bipolar signal with an average value directly related to the generator output voltage, a control circuit connected to the field winding and operative to selectively energize said field winding, said sensing circuit and said control circuit being operatively connected to the generator output and each operative from different half cycles of the generator output potential, and switching circuit means operative to permit energization of said field winding via said control circuit when said bipolar signal is of a certain polarity.

5. A system in accordance with claim 4, and wherein said switching circuit means is a high speed, high gain semi-conductor switching circuit.

6. A sensing circuit for developing a control signal in the form of pulses having a time duration inversely related to the magnitude of an alternating current potential, comprising half-wave rectifying means for developing from the alternating current potential a varying potential unipolar signal, means for developing a constant potential, mixing means for mixing said varying potential signal with said constant potential signal to derive a bipolar pulse signal of said duration and having a wave form in which the varying unidirectional potential is a portion of a sinusoid for alternate half-cycles and the varying portion thereof has half-wave symmetry, and switching means operative in response to said bipolar signal only when said bipolar signal is of a certain polarity to derive thereby a pulsating control signal.

7. A sensing circuit in accordance with claim 6, and wherein said half-wave rectifying means comprises at least one semi-conductor diode, and said constant potential means comprises a semi-conductor device, a resistance and a direct current source of voltage connected across said semi-conductor through said resistance.

8. A sensing cricuit in accordance with claim 6, wherein said mixing means includes a filter circuit operative to reduce but not eliminate ripple from said varying potential unipolar signal.

9. In a system for maintaining a desired voltage output level from a three-phase alternating current generator having a field winding operative to control the generator output potential, the combination of a sensing circuit operative from the generator output potential to develop control pulses having a time duration inversely related to the magnitude of the output potential, said sensing means comprising rectifying means for developing from the output potential a varying potential unipolar signal, circuit means for changing the reference level of said varying potential signal to derive therefrom a bipolar signal, and switching means operative only in response to one polarity of said bipolar signal to provide control pulses of discrete duration; and control circuit means operative from the generator output potential to selectively energize the field winding for the time duration of said control pulses, said sensing circuit and said control circuit means being operative from different half-cycles of the generator output potential.

10. In a system for maintaining a desired voltage output level from a three-phase alternating current generator having a field winding operative to control the generator output potential, the combination of a sensing circuit operative from the generator output potential to develop control pulses having a time duration inversely related to the magnitude of the output potential, said sensing means comprising rectifying means for developing from the output potential a varying potential unipolar signal, circuit means for changing the reference level of said varying potential signal to derive therefrom a bipolar signal, filter means connected to said circuit means to reduce but not eliminate ripple from said varying potential signal, and switching means operative only in response to one polarity of said bipolar signal to provide control pulses of discrete duration; and control circuit means operative from the generator output potential to selectively energize the field winding for the time duration of said control pulses, said sensing circuit and said control circuit means being operative from different half-cycles of the generator output potential.

11. A system in accordance with claim 9, and wherein said control circuit means comprises three semiconductor diodes each poled to conduct during one half-cycle of a different alternating current phase of the generator output potential, and a switching transistor operative to control the time duration in which current flows through said diodes to the field winding.

12. A system in accordance with claim 9, and wherein said rectifying means of said sensing circuit comprises three semiconductor diodes operative to pass current during one half-cycle of a different phase potential, and a semiconductor device, a resistance and a direct current voltage source operatively connected to provide a constant reference potential which when combined therewith converts the unidirectional signal from said rectifying means into a bipolar signal.

13. A system in accordance with claim 9, and further including a semiconductor diode connected across the field winding and poled to provide a low impedance path for current resulting from the collapse of the magnetic field of the field winding.

14. In a system of the type described, the combination of a generator operative to produce a three-phase alternating current output potential and a direct current output potential, a sensing circuit operative to sense said alternating current output potential to derive a bipolar pulse signal with an average value related to the generator output voltage, a control circuit connected to said generator and operative from said generator alternating current output potential to provide a half-wave rectified potential, a switching circuit normally operative from said half-wave direct current output potential and operative to control said generator output potential in accordance with one polarity of said bipolar signal, and starting circuit means to rectify a portion of said alternating current output potential to said switching means when said direct current potential is below a predetermined value.

15. The combination in accordance with claim 14, wherein said starting circuit comprises a controlled rectifier having a gate element and being operative to pass unidirectional current from said alternating current output to said switching circuit in accordance to the potential applied to said gate element, a constant potential semiconductor device, and circuit means including said device and being operative to prevent operation of said controlled diode when said direct current potential reaches the predetermined value.

References Cited in the file of this patent

UNITED STATES PATENTS

| | | |
|---|---|---|
| 2,740,086 | Evans et al. | Mar. 27, 1956 |
| 2,896,149 | Lowry et al. | July 21, 1959 |